(12) United States Patent
Urino (10) Patent No.: US 6,389,201 B1
(45) Date of Patent: May 14, 2002

(54) ARRAYED WAVEGUIDE GRATING HAVING ARRAYED WAVEGUIDE EMPLOYING TAPER STRUCTURE

(75) Inventor: Yutaka Urino, Tokyo (JP)

(73) Assignee: NEC Corporation, Tokyo (JP)

( * ) Notice: Subject to any disclaimer, the term of this patent is extended or adjusted under 35 U.S.C. 154(b) by 35 days.

(21) Appl. No.: 09/685,769

(22) Filed: Oct. 11, 2000

(30) Foreign Application Priority Data

Oct. 14, 1999 (JP) .......................................... 11-293031

(51) Int. Cl.⁷ ................................................. G02B 6/26
(52) U.S. Cl. ...................................................... 385/43
(58) Field of Search .......................................... 385/43

(56) References Cited

U.S. PATENT DOCUMENTS

| 5,414,548 A | * | 5/1995 | Tachikawa et al. .......... 359/130 |
| 5,982,960 A | * | 11/1999 | Akiba ........................... 385/24 |
| 6,069,990 A | * | 5/2000 | Okaw et al. ................... 385/43 |
| 6,122,419 A | * | 9/2000 | Kurokaawa et al. .......... 385/31 |
| 6,282,361 B1 | * | 8/2001 | Nishimura et al. .......... 385/140 |

FOREIGN PATENT DOCUMENTS

| JP | 7-87017 | 3/1995 |
| JP | 8-227059 | 9/1996 |
| JP | 9-49937 | 2/1997 |
| JP | 9-105828 | 4/1997 |
| JP | 10-303815 | 11/1998 |

* cited by examiner

Primary Examiner—Scott J. Sugarman
Assistant Examiner—Mohammed Hasan
(74) Attorney, Agent, or Firm—Sughrue Mion, PLLC (57) ABSTRACT

An arrayed waveguide grating for easily changing the ratio of distribution of an optical signal into the main optical signal and the monitored optical signal is disclosed. In the device, an optical signal incident on an input waveguide is input into an arrayed waveguide via an input-side slab waveguide and is divided into main optical signals having different wavelengths in the arrayed waveguide with respect to a diffraction order m (natural number), and the divided optical signals are transmitted through an output-side slab waveguide and converged on output waveguides. The device has monitoring waveguides for monitoring optical signals having corresponding wavelengths of the main optical signals, where the monitored optical signals are diffracted in the arrayed waveguide with respect to a diffraction order m+i or m−i (i is a natural number), and the arrayed waveguide has a taper structure in the vicinity of the joint of the arrayed waveguide and the output-side slab waveguide, in which the width of each waveguide gradually changes along the direction of light transmission so as to adjust the ratio of distribution into the main optical signal and the monitored optical signal.

6 Claims, 9 Drawing Sheets

ARRAYED WAVEGUIDE GRATING HAVING ARRAYED WAVEGUIDE EMPLOYING TAPER STRUCTURE

BACKGROUND OF THE INVENTION

1. Field of the Invention

The present invention relates to an arrayed waveguide grating used, for example, for a wavelength-division multiplexer/demultiplexer in the field of optical wavelength-division multiplex communication or the like.

2. Description of the Related Art

Recently, optical wavelength-division multiplex communication has been practically used, in which a number of optical signals having different wavelengths are multiplexed and transmitted in a single optical fiber. In systems realizing such multiplex communication, an optical multiplexer/demultiplexer for multiplexing/demultiplexing optical signals according to their wavelengths is an important element.

As such an optical multiplexer/demultiplexer, a bulk-type diffraction grating, a dielectric multiplayer element, and the like are known. However, these known devices have problems such as (i) difficulty of determining each selected wavelength, (ii) high manufacturing cost due to complicated manufacturing processes, (iii) large optical loss, and the like; thus, it has been difficult to apply these devices to wavelength-division multiplex communication for multiplexing/demultiplexing a number of different wavelengths.

Figure 7:
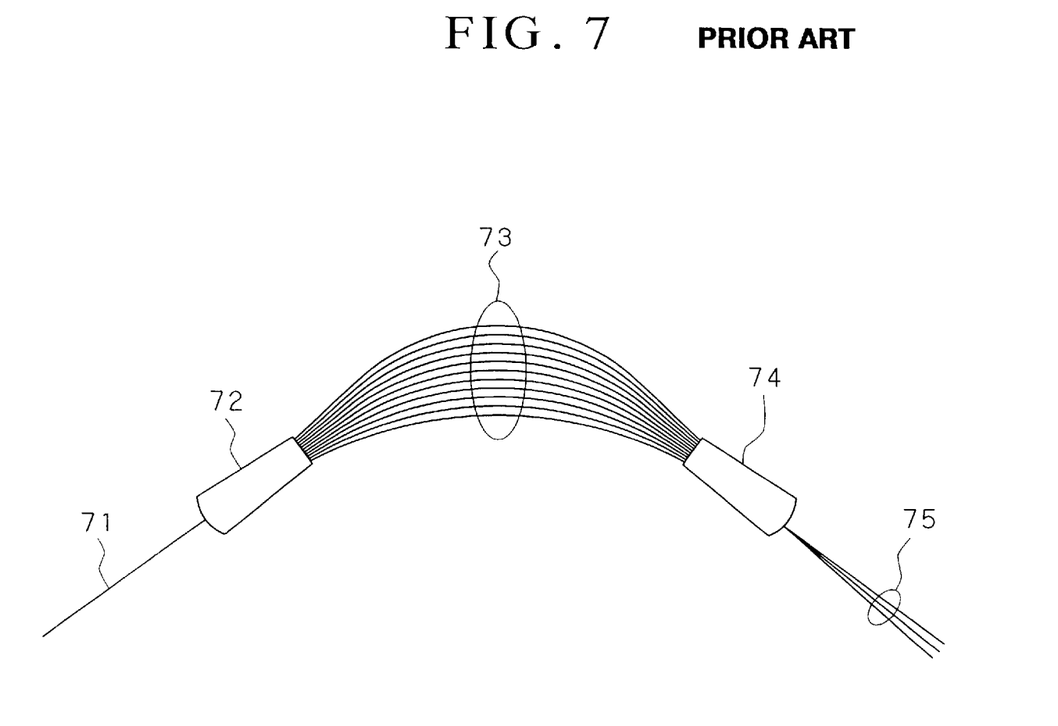
FIG. 7 is a plan showing a conventional example.

Recently, the arrayed waveguide grating, disclosed in H. Yamada, et al, "10 GHz-spacing arrayed-waveguide grating with phase-error-compensating a-Si film", Proceedings of the 1996 Electronics Society Conference of IEICE, C-162, p. 162, 1996, has become the focus of attention. FIG. 7 is a plan showing an example of the arrayed waveguide grating disclosed in the above document.

The shown arrayed waveguide grating consists of one or more input waveguides 71, an input-side slab waveguide 72 connected to the input waveguides 71 for receiving signal(s) from the input waveguides 71, an arrayed waveguide 73 composed of a number of waveguides, connected to the other side of the slab waveguide 72, an output-side slab waveguide 74 connected to the other side of the arrayed waveguide 73, and one or more output waveguides 75 connected to the other side of the slab waveguide 74.

An optical signal incident on the input waveguide 71 is input into the input-side slab waveguide 72, and the optical signal is further input into the arrayed waveguide 73 (composed of a number of waveguides) at the same phase. The input end of the arrayed waveguide 73 and the output end of the input waveguides 71 are respectively arranged to form circles, where the radius of the relevant circle of the arrayed waveguide 73 is twice as much as the radius of the relevant circle of the input waveguides 71, and the positional relationship is such that the center of the relevant circle of the arrayed waveguide 73 corresponds to a position on the relevant circle of the input waveguides 71.

In the arrayed waveguide 73, each waveguide is adjusted so as to provide the same phase difference between any two adjacent waveguides, and the output-side slab waveguide 74 is connected to the other end of the arrayed waveguide, as explained above. Similar to the input side, in the arrangement of the arrayed waveguide 73, the output-side slab waveguide 74, and the output waveguides 75, the output end of the arrayed waveguide 73 and the input end of the output waveguides 75 are respectively arranged to form circles, where the radius of the relevant circle of the arrayed waveguide 73 is twice as much as the radius of the relevant circle of the output waveguides 75, and the positional relationship is such that the center of the relevant circle of the arrayed waveguide 73 corresponds to a position on the relevant circle of the output waveguides 75.

According to the above structure, a wavelength-division multiplexed optical signal incident on the input waveguide 71 is divided into signals having different wavelengths, and each signal is output from an output waveguide 75 corresponding to the relevant wavelength, thereby realizing the wavelength multiplexing/demultiplexing function.

Generally, in optical wavelength division multiplexing (WDM) communication, the ON/OFF state, light intensity, wavelength, or the like of the optical signal should be monitored for each wavelength at some points in the transmission path. In order to execute such a monitoring operation, the optical signal is divided into signals having different wavelengths by using an arrayed waveguide or the like, and the optical signal of a target wavelength is further divided into a main optical signal and a monitored optical signal by using an (optical) fiber coupler or the like, and then the monitored optical signal is monitored using a photodetector or the like.

However, in the above monitoring method, the same number of fiber couplers as the number of the wavelength channels are necessary, and thus the system is complicated and the system cost is increased due to the necessary cost and space for providing the fiber couplers. Additionally, in this case, after the division of an optical signal using a wavelength multiplexer/demultiplexer, the optical power of the main optical signal is again decreased by further dividing the signal using fiber couplers or the like. Therefore, the power loss of the main optical signal is large.

In order to solve the above problem, Japanese Unexamined Patent Application, First Publication, No. Hei 10-303815 discloses an optical wavelength-division multiplexer/demultiplexer having a monitor function explained later in detail, in which a function of monitoring the optical signal of each wavelength is added to the wavelength-division multiplexing/demultiplexing function necessary for the WDM communication, thereby omitting fiber couplers or the like, and decreasing the cost, size, and optical loss of the WDM communication system.

Figure 8:
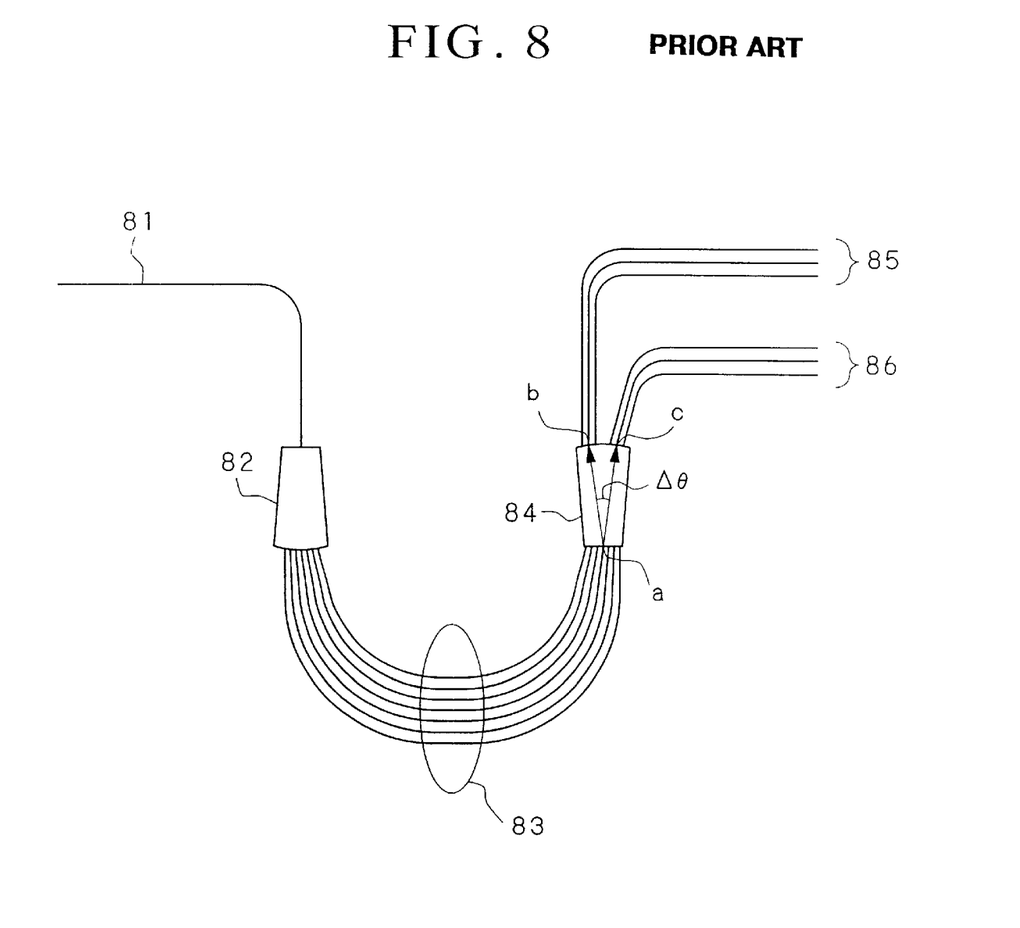
FIG. 8 is a plan showing a conventional example.

FIG. 8 is a plan showing the optical wavelength-division multiplexer/demultiplexer having the monitor function disclosed in the above publication. The disclosed system comprises an input waveguide 81, an input-side slab waveguide 82 connected to the input waveguide 81 for receiving a signal from the input waveguide 81, an arrayed waveguide 83 composed of a number of waveguides, connected to the other side of the slab waveguide 82, an output-side slab waveguide 84 connected to the other side of the arrayed waveguide 83, N output waveguides 85 connected to the other side of the slab waveguide 84, and N monitoring waveguides 86 used for the monitoring operation. The optical signal is wavelength-divided by the arrayed waveguide, and transmitted through the output-side slab waveguide 84 and converged onto the output waveguides 85. Simultaneously, the optical signal is wavelength-divided by the arrayed waveguide due to interference of the next order to the main order of interference (i.e., order of diffraction) of the arrayed waveguide, and the N monitoring waveguides 86 are positioned where these wavelength-divided optical signals (related to the next order of interference) converge.

Here, the difference $\Delta\theta$ between diffracted optical signals (i.e., diffracted light beams) having a difference "i" of the diffraction order (i.e., order of diffraction) therebetween can be defined as follows while $\Delta\theta$ is sufficiently small:

$$\Delta\theta = i\lambda/(nd) \quad (1)$$

where n indicates the effective refractive index in the output-side slab waveguide, $\lambda$ indicates the wavelength of the optical signal, and d indicates the pitch of the arrayed waveguide at the joint (portion) of the arrayed waveguide and the output-side slab waveguide.

In FIG. 8, if it is assumed that (i) "a" is the center point of the arrayed waveguide 83 at the joint of the arrayed waveguide 83 and the output-side slab waveguide 84, (ii) "b" is an end of the output waveguide 85, at which an optical signal of a target wavelength is converged via the output-side slab waveguide 84, and (iii) "c" is an end of the monitoring waveguide 86, at which the corresponding monitored optical signal is converged via the output-side slab waveguide 84, then the relevant monitoring waveguide 86 is arranged in a manner such that the angle between the line a-b and the line a-c is $\Delta\theta$ indicated in the above formula (1).

An optical signal having another wavelength is converged on another output waveguide 85; thus, the monitoring waveguides 86 corresponding to each wavelength are respectively arranged in a manner such that each monitoring waveguide 86 is positioned along the direction rotated from the direction of the corresponding output waveguide 85 (related to the target wavelength) by angle $\Delta\theta$ in the formula (1). Generally, the diffraction order m is determined so as to provide the maximum diffraction efficiency of the main optical signal; thus, the most efficient diffraction order of the diffracted optical signal used for monitoring is m+1 or m−1, and in this case, the optical signal can be most efficiently monitored.

Under the above conditions, the angle $\Delta\theta$ between the output waveguide 85 (for the main optical signal) and the corresponding monitoring waveguide 86 is defined as follows:

$$\Delta\theta = \lambda/(nd) \quad (2)$$

The diffraction efficiency P0 of the diffracted (main) optical signal converged on the output waveguide 85 and the diffraction efficiency P1 of the diffracted (and monitored) optical signal converged on the monitoring waveguide are defined as follows:

$$P0 = 1/S \quad (3)$$

$$P1 = \exp(-2(\pi w/d)^2)/S \quad (4)$$

$$S = 1 + 2\Sigma[\exp(-2(i\,\pi w/d)^2)] \quad (5)$$

where w indicates the spot size (the $1/e^2$ half power width of the power distribution of the optical signal parallel to the substrate and perpendicular to the waveguide) of the arrayed waveguide 83 at the joint of the arrayed waveguide 83 and the output-side slab waveguide 84, and $\Sigma$ indicates the sum from i=1 to $\infty$.

Figure 9:
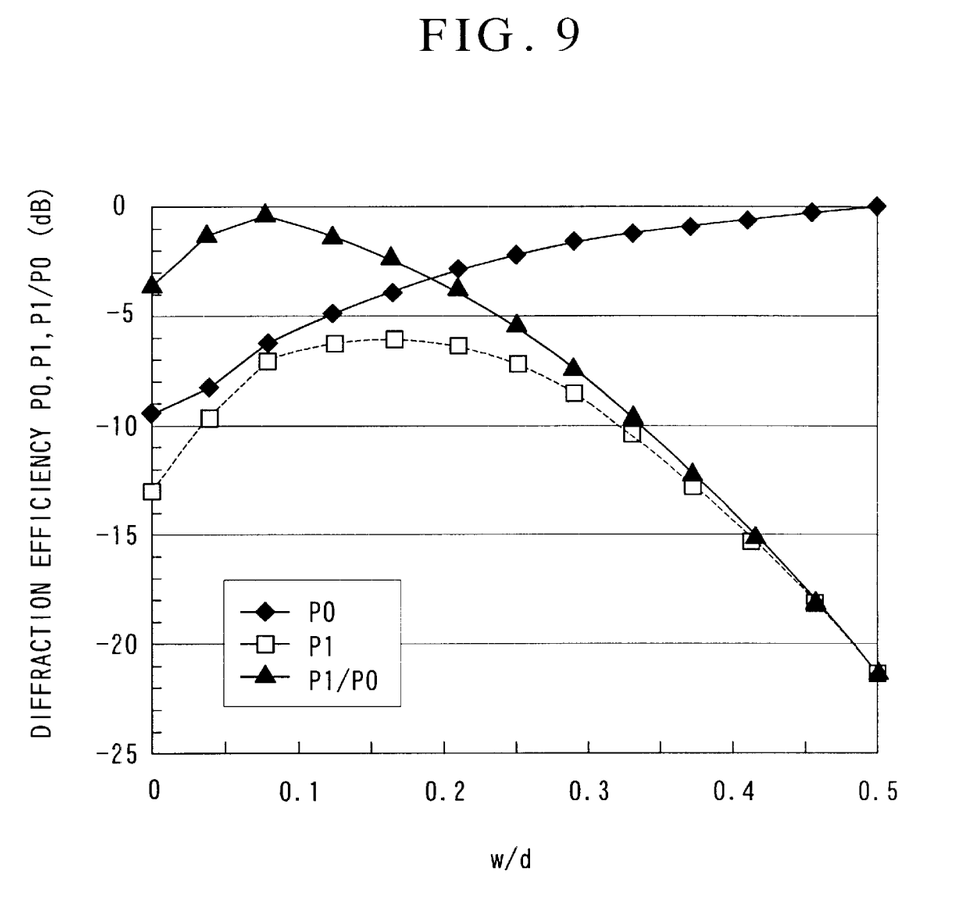
FIG. 9 is a graph showing the ratio of distribution into the main optical signal and the monitored optical signal.

FIG. 9 shows variations in (i) the diffraction efficiency P0 of the main optical signal, (ii) the diffraction efficiency P1 of the monitored optical signal, and (iii) the ratio P0/P1 when the value w/d calculated using formulas (3) to (5) varies. As obvious from FIG. 9, an arbitrary ratio of distribution (i.e., division) into the main optical signal and the monitored optical signal can be selected by suitably adjusting the pitch d and spot size w of the arrayed waveguide 83 at the joint of the arrayed waveguide 83 and the output-side slab waveguide 84.

However, the pitch d and the width of the waveguide of the arrayed waveguide 83 are fixed to some degree at the joint with the output-side slab waveguide 84; therefore, in order to change the ratio of distribution into the main optical signal and the monitored optical signal, it is necessary to determine the pitch d again.

SUMMARY OF THE INVENTION

In consideration of the above circumstances, an objective of the present invention is to provide an arrayed waveguide grating for easily changing the ratio of distribution of an optical signal into the main optical signal and the monitored optical signal.

Therefore, the present invention provides an arrayed waveguide grating comprising:

a substrate;

one or more input waveguides, provided on the substrate;

one or more output waveguides provided on the substrate;

an arrayed waveguide including two or more waveguides arranged in a manner such that the lengths of the arranged waveguides gradually increase by a predetermined length difference;

an input-side slab waveguide for connecting the input waveguides and the arrayed waveguide; and an output-side slab waveguide for connecting the output waveguides and the arrayed waveguide, and wherein:

an optical signal incident on the input waveguide is input into the arrayed waveguide via the input-side slab waveguide and is divided into main optical signals having different wavelengths in the arrayed waveguide with respect to a diffraction order m, m being a natural number, and the divided optical signals are transmitted through the output-side slab waveguide and converged on the output waveguides, and the arrayed waveguide grating further comprising:

one or more monitoring waveguides for monitoring optical signals having corresponding wavelengths of the main optical signals, where the monitored optical signals are diffracted in the arrayed waveguide with respect to a diffraction order m+i or m−i, i being a natural number, and the monitored optical signals converge on the monitoring waveguides, and wherein:

the arrayed waveguide has a taper structure in the vicinity of the joint of the arrayed waveguide and the output-side slab waveguide, and in the taper structure, the width of each waveguide gradually changes along the direction of light transmission so as to adjust the ratio of distribution of each optical signal into the main optical signal and the monitored optical signal.

The present invention also provides an arrayed waveguide grating comprising a similar structure, where photodetectors are provided in place of the monitoring waveguides.

Typically, in the taper structure of the arrayed waveguide, the width of each waveguide gradually decreases or increases towards the joint of the arrayed waveguide and the output-side slab waveguide.

According to the present invention, the spot size of the arrayed waveguide can be adjusted by suitably providing the taper structure, and a desired ratio of distribution of each optical signal into the main optical signal and the monitored optical signal can be easily selected without changing the pitch of the arrayed waveguide, or the width of the whole portion of each waveguide of the arrayed waveguide.

When the above photodetectors are used, the photodetectors can be placed in a space provided in the arrayed waveguide grating; thus, the device size including the monitoring system can be smaller.

DESCRIPTION OF THE PREFERRED EMBODIMENTS

Hereinafter, embodiments according to the present invention will be explained in detail with reference to the drawings.

Figure 1:
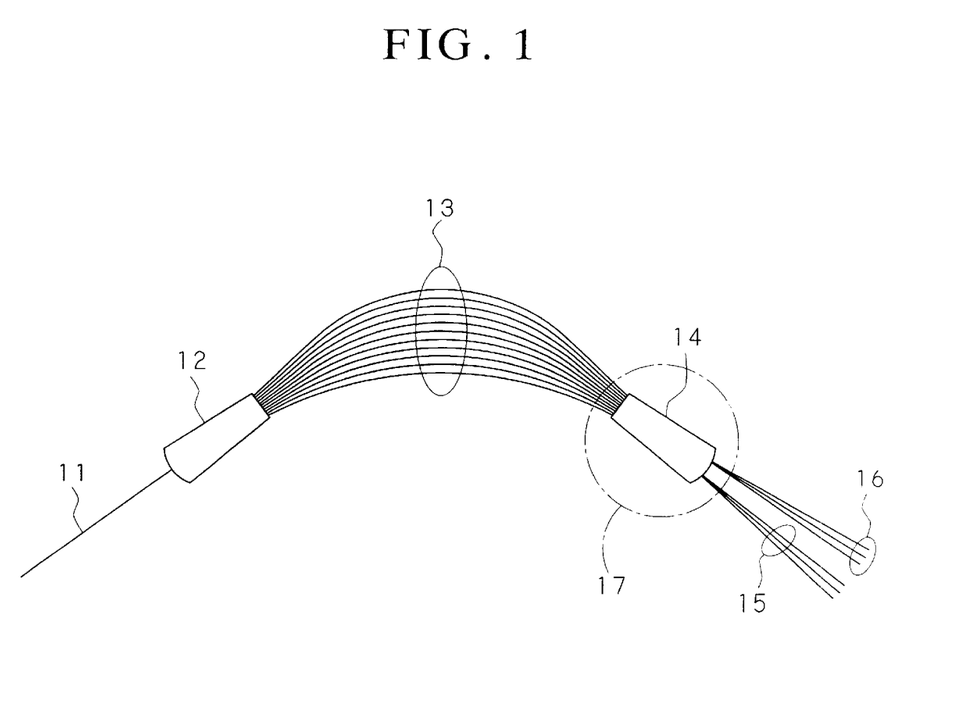
FIG. 1 is a plan showing the structure of the first embodiment according to the present invention.
Figure 2:
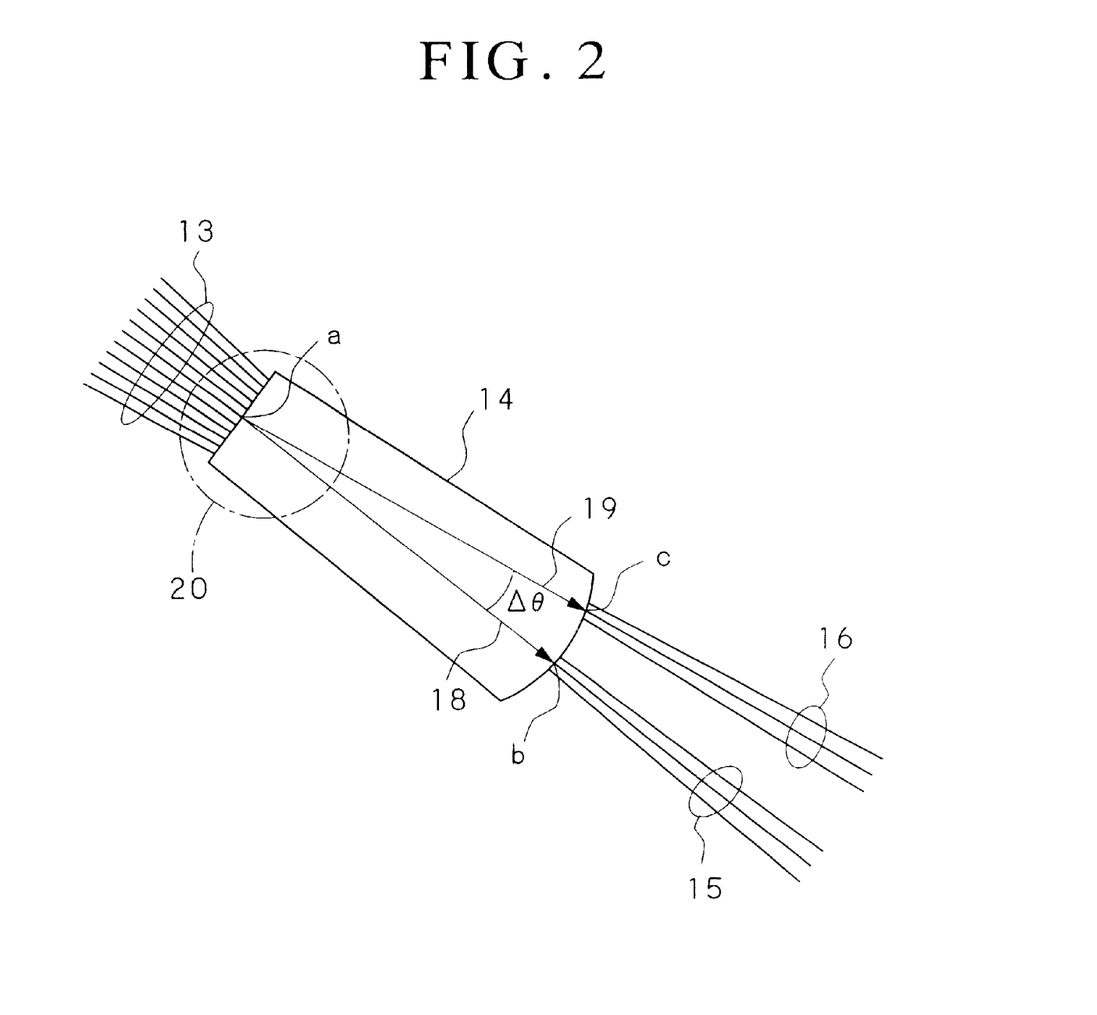
FIG. 2 is a partially enlarged view of the first embodiment.
Figure 3:
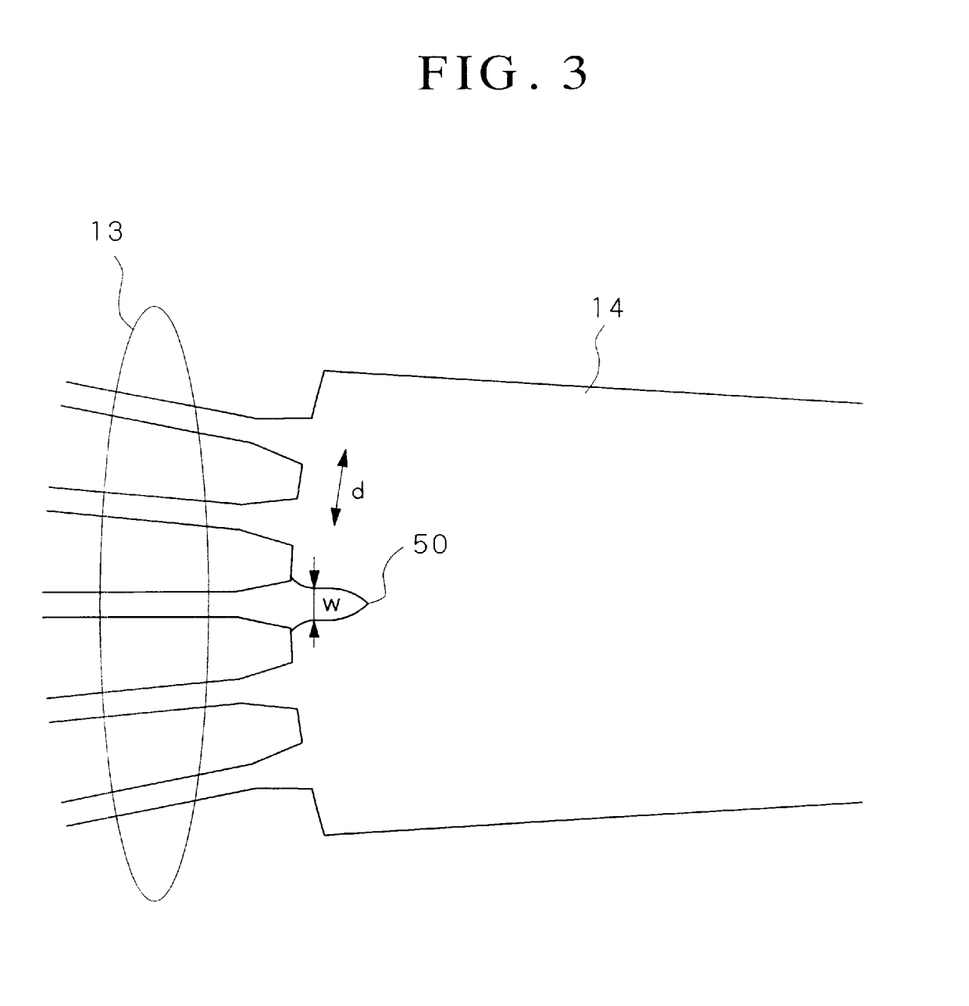
FIG. 3 is an enlarged view showing an example of the structure of the present invention.
Figure 4:
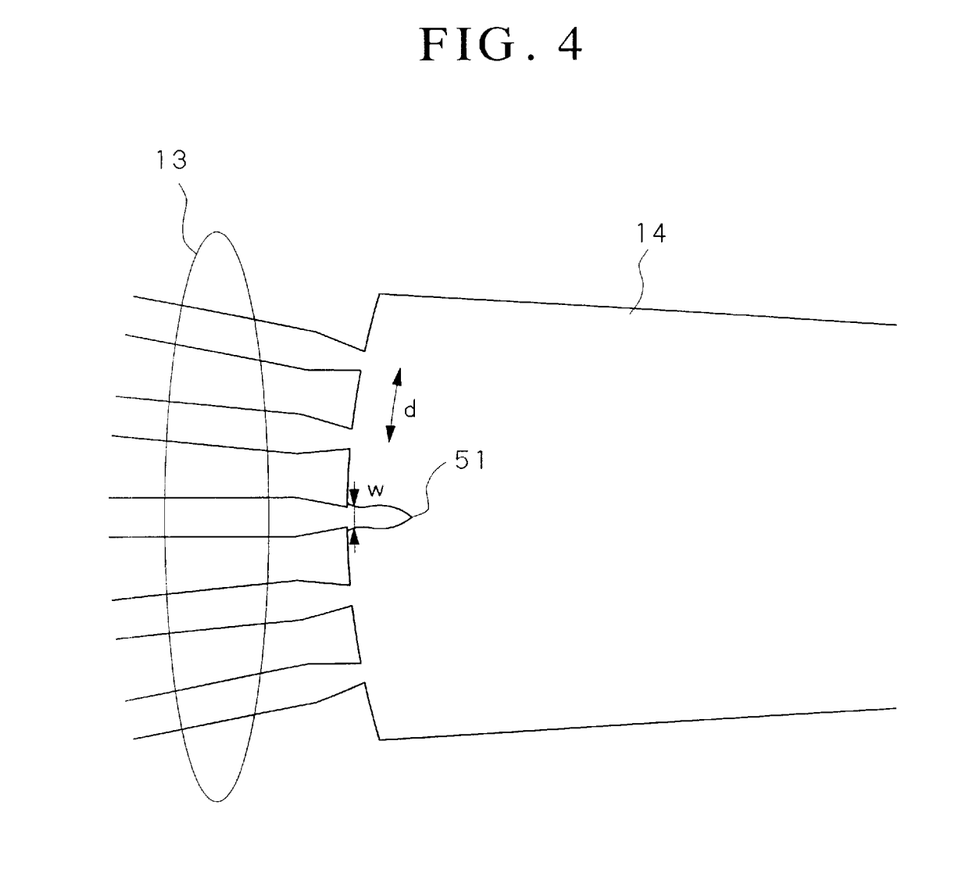
FIG. 4 is an enlarged view showing another example of the structure of the present invention.

FIG. 1 is a plan showing the arrayed waveguide grating as the first embodiment of the present invention, where the basic structure thereof is the same as that shown in FIG. 8. FIG. 2 is an enlarged view of the part surrounded by circle 17 in FIG. 1, and FIGS. 3 and 4 are enlarged views showing structural examples of the present invention.

In FIG. 1, the arrangement comprises one or more input waveguides 11, an input-side slab waveguide 12 connected to the input waveguides 11 for receiving signal(s) from the input waveguides 11, an arrayed waveguide 13 composed of a number of waveguides, connected to the other side of the slab waveguide 12, an output-side slab waveguide 14 connected to the other side of the arrayed waveguide 13, and one or more output waveguides 15 connected to the other side of the slab waveguide 14. Here, the arrayed waveguide 13 includes two or more waveguides arranged in a manner such that the lengths of the arranged waveguides gradually increase by a predetermined length difference.

The optical signal incident on the input waveguide 11 is input into the input-side slab waveguide 12, and further input at the same phase into the arrayed waveguide 13 composed of a number of waveguides. The input end of the arrayed waveguide 13 and the output end of the input waveguide 11 are respectively arranged to form circles, where the radius of the relevant circle of the arrayed waveguide 13 is twice as much as the radius of the relevant circle of the input waveguides 11, and the positional relationship is such that the center of the relevant circle of the arrayed waveguide 13 corresponds to a position on the relevant circle of the input waveguides 11.

The waveguides included in the arrayed waveguide 13 are arranged to provide phase differences at equivalent intervals. The output-side slab waveguide 14 is connected the other end of the arrayed waveguide 13, as explained above. Similar to the input side, in the arrangement of the arrayed waveguide 13, the output-side slab waveguide 14, and the output waveguides 15, the output end of the arrayed waveguide 13 and the input end of the output waveguides 15 are respectively arranged to form circles, where the radius of the relevant circle of the arrayed waveguide 13 is twice as much as the radius of the relevant circle of the output waveguides 15, and the positional relationship is such that the center of the relevant circle of the arrayed waveguide 13 corresponds to a position on the relevant circle of the output waveguides 15.

According to the above structure, the wavelength-division multiplexed optical signal incident on the input waveguide 11 is divided into signals having different wavelengths, and each signal is output from an output waveguide 15 corresponding to the relevant wavelength, thereby realizing the wavelength multiplexing/demultiplexing function. The above-explained structure and function are similar to those of the conventional example shown in FIGS. 7 and 8.

Also similar to the conventional example shown in FIG. 8, if it is assumed in the arrayed waveguide grating of the first embodiment that m (natural number) indicates the order of diffraction (i.e., diffraction order) of each optical signal 18, transmitted through the output-side slab waveguide 14 and converged on the corresponding output waveguide 15, then each of one or more waveguides 16 for monitoring the optical signal 18 is provided at a position on which a diffracted optical signal 19 having the corresponding wavelength is converged, where the diffraction order of the diffracted optical signal 19 is m±i (here, i is also a natural number).

Accordingly, difference $\Delta\theta$ of the angle of diffraction between two diffracted optical signals having a difference i in the diffraction order can be defined by the above formula (1) while $\Delta\theta$ is sufficiently small. In the present case, n indicates the effective refractive index in the output-side slab waveguide 14, $\lambda$ indicates the wavelength of the optical signal, and d indicates the pitch of the arrayed waveguide 13 at the joint (portion) of the arrayed waveguide 13 and the output-side slab waveguide 14.

As shown in FIG. 2, if it is assumed that (i) "a" is the center point of the arrayed waveguide 13 at the joint of the arrayed waveguide 13 and the output-side slab waveguide 14, (ii) "b" is an end of the output waveguide 15, at which an optical signal 18 of a target wavelength converges via the output-side slab waveguide 14, and (iii) "c" is an end of the monitoring waveguide 16, at which the corresponding monitored optical signal converges via the output-side slab waveguide 14, then the relevant monitoring waveguide 16 is arranged in a manner such that the angle between the line a-b and the line a-c is $\Delta\theta$ indicated in the above formula (1).

Similarly, an optical signal having another wavelength converges on another output waveguide 15; thus, the monitoring waveguides 16 corresponding to each wavelength are respectively arranged in a manner such that each monitoring waveguide 16 is positioned along the direction rotated from the direction of the corresponding output waveguide 15 (related to the target wavelength) by angle $\Delta\theta$ in the formula (1).

Generally, the diffraction order m is determined so as to provide the maximum diffraction efficiency of the main optical signal 18; thus, the most efficient diffraction order of the diffracted optical signal used for monitoring is m +1 or m−1, and in this case, the optical signal can be most efficiently monitored. The angle $\Delta\theta$ between the output waveguide 15 (for the main optical signal) and the corresponding monitoring waveguide 16 is defined using the above formula (2).

The diffraction efficiency P0 of the diffracted (main) optical signal converged on the output waveguide 15 and the diffraction efficiency P1 of the diffracted optical signal converged on the monitoring waveguide 16 are defined using the above formulas (3) to (5). In the present case, w indicates the spot size (the $1/e^2$ half power width of the power distribution of the optical signal parallel to the substrate) of the arrayed waveguide 13 at the joint of the arrayed waveguide 13 and the output-side slab waveguide 14, and Σ indicates the sum from i=1 to ∞.

The variations in (i) the diffraction efficiency P0 of the main optical signal, (ii) the diffraction efficiency P1 of the monitored optical signal, and (iii) the ratio P0/P1 when the value w/d calculated using formulas (3) to (5) varies are also shown by the above FIG. 9. That is, an arbitrary ratio of distribution (i.e., division) into the main optical signal and the monitored optical signal can be selected by suitably adjusting the pitch d and spot size w of the arrayed waveguide 13 at the joint of the arrayed waveguide 13 and the output-side slab waveguide 14. However, generally, the pitch d and the size of the waveguide of the arrayed waveguide 13 are fixed to some degree at the joint of the arrayed waveguide 13 and the output-side slab waveguide 14; therefore, it is not easy to adjust the ratio of distribution by directly changing the pitch or the size of the waveguide.

Therefore, in order to adjust the ratio of distribution (or division) into the main optical signal and the monitored optical signal, the present invention provides a device for easily adjusting the spot size w, which has a taper structure in the arrayed waveguide 13, in the vicinity of the joint of the arrayed waveguide 13 and the output-side slab waveguide 14. In the taper structure, the width of the waveguide gradually changes towards the direction of light transmission.

FIGS. 3 and 4 show examples of the arrayed waveguide grating employing such a taper structure in the arrayed waveguide 13, in the vicinity of the joint of the arrayed waveguide 13 and the output-side slab waveguide 14.

In FIG. 3, the arrayed waveguide 13 includes a taper structure in which the width of each waveguide gradually increases towards the joint of the arrayed waveguide 13 and the output-side slab waveguide 14. Reference numeral 50 indicates an optical mode field distribution, and as shown by the distribution 50, the spot size w is relatively large due to the taper structure.

In contrast, in FIG. 4, the arrayed waveguide 13 includes a taper structure in which the width of each waveguide gradually decreases towards the joint of the arrayed waveguide 13 and the output-side slab waveguide 14. Reference numeral 51 indicates an optical mode field distribution, and as shown by the distribution 51, the spot size w is relatively small due to the taper structure.

According to the above structures, it is possible to isolate the monitored optical signal from the main optical signal at a desired ratio of distribution, and also to use a diffracted optical signal having a diffraction order other than the diffraction order of the main optical signal as the monitored optical signal. Generally, such a diffracted optical signal having another diffraction order functions as an optical loss in conventional systems. Therefore, the loss of the WDM communication system can be low.

Figure 5:
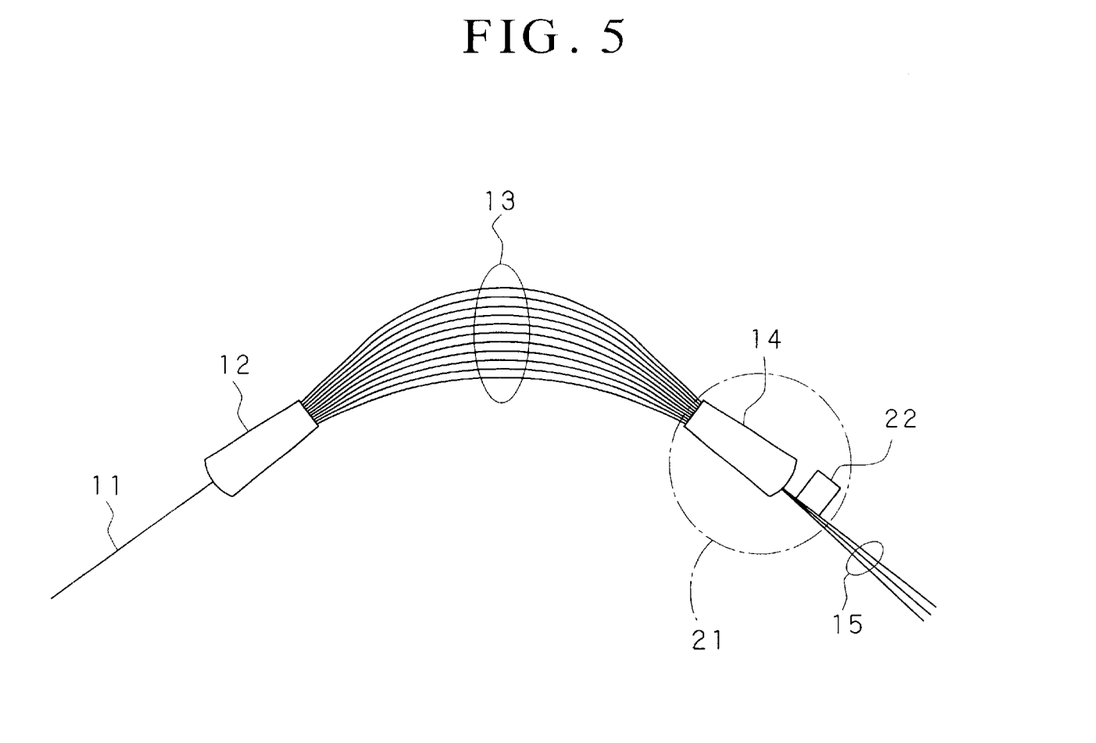
FIG. 5 is a plan showing the structure of the second embodiment according to the present invention.
Figure 6:
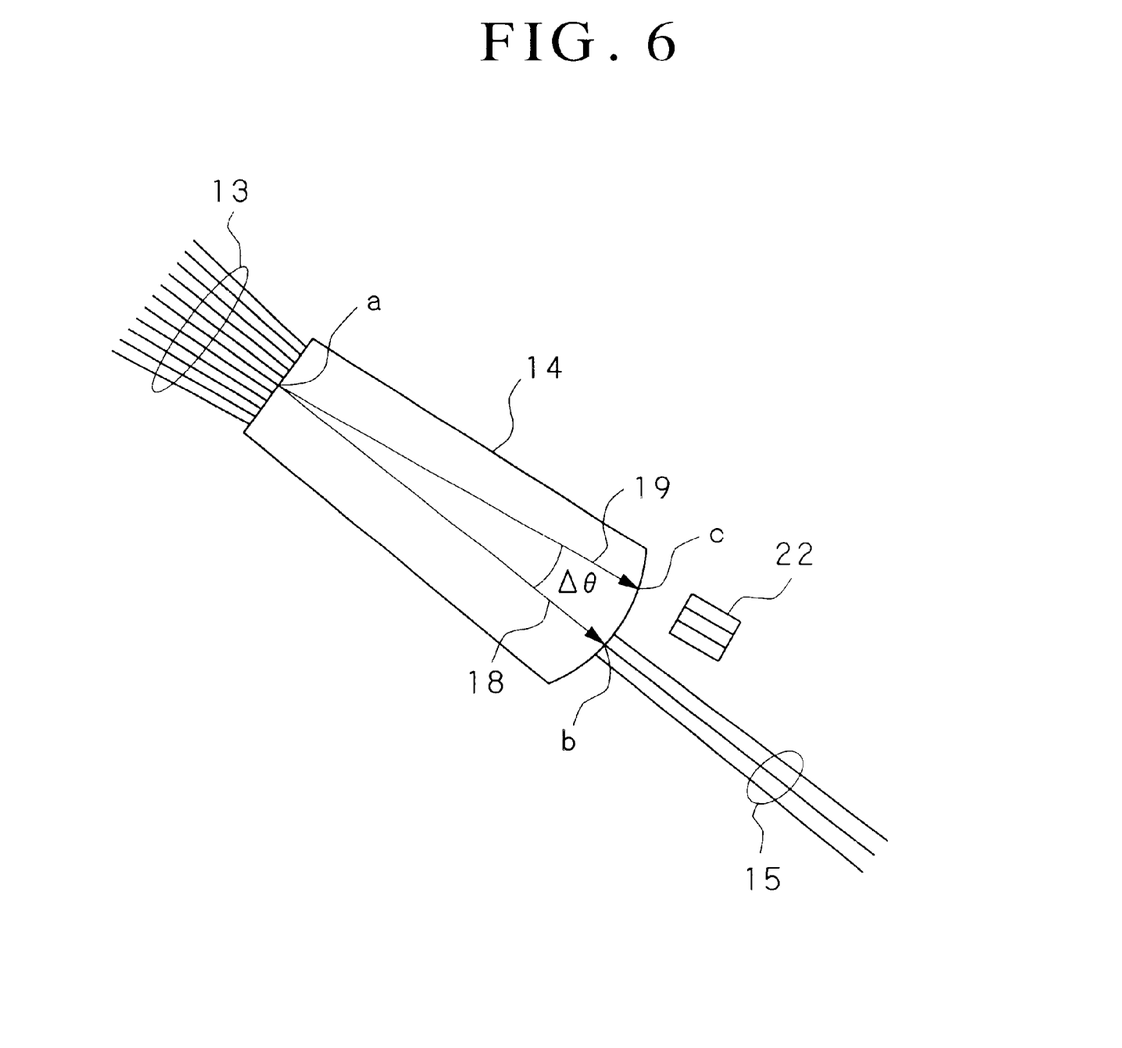
FIG. 6 is a partially enlarged view of the second embodiment.

FIG. 5 is a plan showing the arrayed waveguide grating as the second embodiment according to the present invention, and FIG. 6 is an enlarged view of the part surrounded by the circle 21 in FIG. 5. In this embodiment, photodetection array 22 is provided in place of the monitoring waveguides 16 used in the first embodiment. In the present structure, the monitored optical signals of each wavelength are directly received by the photodetection array 22.

The other functions are the same as those of the first embodiment. In the present embodiment, the one or more photodetectors (here, photodetection array) can be placed in a space provided in the arrayed waveguide grating; thus, the device size including the monitoring system can be smaller.

The present invention is not limited to the above embodiments, and any modification is possible within the scope and spirit of the present invention.

What is claimed is:

1. An arrayed waveguide grating comprising:

a substrate;

one or more input waveguides, provided on the substrate;

one or more output waveguides provided on the substrate;

an arrayed waveguide including two or more waveguides arranged in a manner such that the lengths of the arranged waveguides gradually increase by a predetermined length difference;

an input-side slab waveguide for connecting the input waveguides and the arrayed waveguide; and an output-side slab waveguide for connecting the output waveguides and the arrayed waveguide, and wherein:

an optical signal incident on the input waveguide is input into the arrayed waveguide via the input-side slab waveguide and is divided into main optical signals having different wavelengths in the arrayed waveguide with respect to a diffraction order m, m being a natural number, and the divided optical signals are transmitted through the output-side slab waveguide and converged on the output waveguides, and the arrayed waveguide grating further comprising:

one or more monitoring waveguides for monitoring optical signals having corresponding wavelengths of the main optical signals, where the monitored optical signals are diffracted in the arrayed waveguide with respect to a diffraction order m+i or m−i, i being a natural number, and the monitored optical signals converge on the monitoring waveguides, and wherein:

the arrayed waveguide has a taper structure in the vicinity of the joint of the arrayed waveguide and the output-side slab waveguide, and in the taper structure, the width of each waveguide gradually changes along the direction of light transmission so as to select a desired ratio of distribution of each optical signal into the main optical signal and the monitored optical signal.

2. An arrayed waveguide grating as claimed in claim 1, wherein in the taper structure of the arrayed waveguide, the width of each waveguide gradually decreases towards the joint of the arrayed waveguide and the output-side slab waveguide.

3. An arrayed waveguide grating as claimed in claim 1, wherein in the taper structure of the arrayed waveguide, the width of each waveguide gradually increases towards the joint of the arrayed waveguide and the output-side slab waveguide.

4. An arrayed waveguide grating comprising:

a substrate;

one or more input waveguides, provided on the substrate;

one or more output waveguides provided on the substrate;

an arrayed waveguide including two or more waveguides arranged in a manner such that the lengths of the arranged waveguides gradually increase by a predetermined length difference;

an input-side slab waveguide for connecting the input waveguides and the arrayed waveguide; and an output-side slab waveguide for connecting the output waveguides and the arrayed waveguide, and wherein:

an optical signal incident on the input waveguide is input into the arrayed waveguide via the input-side slab waveguide and is divided into main optical signals having different wavelengths in the arrayed waveguide with respect to a diffraction order m, m being a natural number, and the divided optical signals are transmitted through the output-side slab waveguide and converged on the output waveguides, and the arrayed waveguide grating further comprising:

one or more photodetectors for monitoring optical signals having corresponding wavelengths of the main optical signals, where the monitored optical signals are diffracted in the arrayed waveguide with respect to a diffraction order m+i or m−i, i being a natural number, and the monitored optical signals converge on the photodetectors, and wherein:

the arrayed waveguide has a taper structure in the vicinity of the joint of the arrayed waveguide and the output-side slab waveguide, and in the taper structure, the width of each waveguide gradually changes along the direction of light transmission so as to select a desired ratio of distribution of each optical signal into the main optical signal and the monitored optical signal.

5. An arrayed waveguide grating as claimed in claim 4, wherein in the taper structure of the arrayed waveguide, the width of each waveguide gradually decreases towards the joint of the arrayed waveguide and the output-side slab waveguide.

6. An arrayed waveguide grating as claimed in claim 4, wherein in the taper structure of the arrayed waveguide, the width of each waveguide gradually increases towards the joint of the arrayed waveguide and the output-side slab waveguide.

* * * * *